United States Patent [19]

Takaba

[11] Patent Number: 4,591,766
[45] Date of Patent: May 27, 1986

[54] BRUSHLESS DIRECT CURRENT MOTOR
[75] Inventor: Yosuke Takaba, Kajiwara, Japan
[73] Assignee: Tamagawa Seiki Kabushiki Kaisha, Tokyo, Japan
[21] Appl. No.: 694,460
[22] Filed: Jan. 24, 1985
[30] Foreign Application Priority Data
  Jan. 27, 1984 [JP] Japan .................................. 59-12019
[51] Int. Cl.⁴ ......................... H02K 1/12; H02K 29/12
[52] U.S. Cl. .................................... 318/254; 310/216; 310/218; 310/254
[58] Field of Search ................... 318/138, 254 A, 254, 318/439; 310/46, 68 R, 216, 218, 254

[56] References Cited
U.S. PATENT DOCUMENTS

| | | | |
|---|---|---|---|
| 3,518,473 | 6/1970 | Nordebo | 310/180 X |
| 3,683,248 | 8/1972 | Kobayashi et al. | 318/254 X |
| 4,038,575 | 7/1977 | Norbedo | 310/179 |
| 4,260,925 | 4/1981 | Barrett | 310/216 |

Primary Examiner—Bernard Roskoski
Assistant Examiner—Bentsu Ro
Attorney, Agent, or Firm—Robert E. Burns; Emmanuel J. Lobato; Bruce L. Adams

[57] ABSTRACT

A brushless d.c. motor having a stator including a stator core with a plurality of Y-shaped magnetic poles. The magnetic poles have a first portion which extend radially outwardly from a hub portion of the core, second portions which extend from an outer end of the first portion in the opposite circumferential directions and third portions that extend from a tip of the second portions to the radially outer direction. A first stator windings are wound on the first portions of the magnetic pole and serially connected to each other for each of the magnetic poles, and second windings are wound on one of the third portions and the adjacent third portion of the contiguous magnetic pole, and serially connected to each other. The phases of the stator windings are shifted relative to each other.

2 Claims, 3 Drawing Figures

BRUSHLESS DIRECT CURRENT MOTOR

BACKGROUND OF THE INVENTION

This invention relates to a brushless d.c. motor, and particularly to a core polyphase coil motor.

Burshless d.c. motors comprise a stator having a stator core with a plurality of pole pieces peripherally disposed in parallel, a stator winding wound around the pole pieces, a pattern conductor for frequency generation and a control circuit for controlling an exciting current of the stator winding responsive to a speed control signal from the pattern conductor, and a rotor rotatably mounted to the stator, having a plurality of permanent magnets opposite to the pole piece surfaces of the stator and a permanent magnet for frequency generation. The pole pieces of the stator core consist of a plurality of linear type pole pieces on which are wound 2-phase coils the phases of which are alternately shifted by 90 degrees. The first phase coils are serially connected so that the polarily alternately changes, each coil being wound over half the roughly root side of two radial pole pieces contiguous to each other. The second phase coils are serially connected, also so that the polarity alternately changes, each coil being wound over half the roughly point side of two pole pieces contiguous to each other, but the pole pieces which are wound by the second coils are shifted by one pole in comparison with the first phase coils. Accordingly, although spaces are formed to receive both coils on the sides of each pole piece which is radially extended, only the outer sides or half the inner sides of these spaces are used to receive the coils. So the remaining half space is not used, and the larger the space for receiving the coils becomes, the greater the unused space becomes. This results in the coils being larger in proportion thereto and the height of the coil end part and the length of the coil strands become greater so that this prior art has the disadvantage that miniturization of the motor, reduction of the d.c. resistance of the coils, and the coil winding operation are all difficult.

SUMMARY OF THE INVENTION

An object of the present invention therefore is to provide a brushless direct current motor that eliminates the unnecessary and harmful spaces between pole pieces, is small with high-performance, and can be easily manufactured.

With the above objects in view, the brushless d.c. motor of the present invention comprises a stator and a rotor. The stator comprises a stator core with a plurality of magnetic pole pieces which are parallelly disposed circumferentially and separated by slots, stator windings which are wound around the magnetic pole pieces, a pattern conductor for frequency generation which is mounted on the stator core, and a drive circuit which can be connected to a power source and which controls the exciting current to the stator windings in response to a speed control signal from the pattern conductor. The rotor comprises a yoke which is rotatably provided on the stator, a plurality of permanent mangets which are provided on the yoke and have magnetic pole faces in opposition to the magnetic faces of the magnetic pole pieces, and a permanent magnet for frequency generation which is mounted on the yoke in opposition to the pattern conductor. The magnetic pole pieces each have a first portion which extends in an outer radial direction, two second portions which extend from the radial outer end of the first portion in opposite directions from each other substantially circumferentially, and third portions which extend from each peripheral end of the second portions to the outer radial direction. The stator windings are comprised of first windings which are wound on the first portion and serially connected to each other for each of the magnetic pole pieces, and second windings which are wound around both two of adjacent third portions and of a contiguous magnetic pole pieces, serially connected to each other, and the phase thereof is shifted in relation to the first windings.

BRIEF DESCRIPTION OF THE DRAWING

The invention will become readily apparent from the following detailed description of the preferred embodiments taken in conjunction with the accompanying drawings, in which.

DESCRIPTION OF THE PREFERRED EMBODIMENTS

Figure 1:
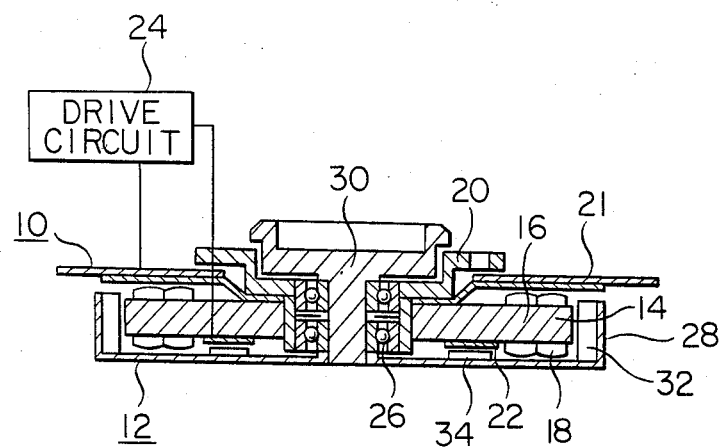
FIG. 1 is a schematic cross-sectional view showing a brushless d.c. motor of this invention.

FIG. 1 shows a section of a brushless d.c. motor of this invention. The brushless d.c. motor comprises a stator 10 and a rotor 12 which is rotatably supported in relation to the stator 10. The stator 10 comprises a laminated stator core 16 having a plurality of pole pieces 14 which are disk shaped as a whole and are separated from each other by slots and parallely disposed circumferentially, a plurality of stator windings 18 which are wound around the pole pieces 14 of the stator core 16, a housing 20 which supports the core 16 on its inner circumference and has a mounting flange part and a shielding 21 which is secured to the housing 20 and performs magnetic shielding. The stator 10 further comprises a frequency generating pattern conductor 22 secured on the core 16, which produces pulse signals by relatively crossing the flux from the permanent magnets for frequency generation on the rotor 12 as described below, and a drive circuit 24 which controls the motor speed by controlling the exciting current of the stator windings 18 responsive to the pulse signals from the pattern conductor 22.

The rotor 12 includes a shaft 30 which is rotatably supported by the housing 20 through bearings 26, so that a yoke 28 is rotatable in relation to the stator 10. The yoke 28 is made of generally disk shaped magnetic material having a cylindrical rising portion on its periphery. This rising portion is formed in opposition to the outer radial side of the pole pieces 14 of the stator core 16 of the stator 10. On the inner peripheral surface of the rising portion permanent magnets are secured in the same numbers as the number of pole pieces 14. The permanent magnets 32 are individually arranged peripherally with the some distance between each manget so that the porality thereof alternately changes. The rotor 12 also includes a ring-shaped permanent magnet 34 for frequency generation. The magnet 34 is mounted on the inner surface of the disk shaped portion of the yoke 28 opposite to the ring-shaped pattern conductor 22. The polarities of a plurality of magnetic poles of the permanent magnet 34 also alternately change. The flux thereof is arranged to extend through the pattern conductor 22.

The stator winding 18 comprises coils 36 and 38 of which the two phases are shifted 90 degrees with each other. The first phase coils 36 are wound around the radially inner portion of the pole pieces 14 and are serially connected so that their polarities alternately change. The second phase coils are wound around the radially outer portion of the pole pieces 14 and are serially connected so that the polarity alternately changes. The stator windings 18 receive the output from a drive circuit 24 connected to a d.c. power source (not shown). The flux which is generated interacts with the flux of the permanent magnets 32 of the rotor 12 making the rotor 12 rotate.

Figure 2:
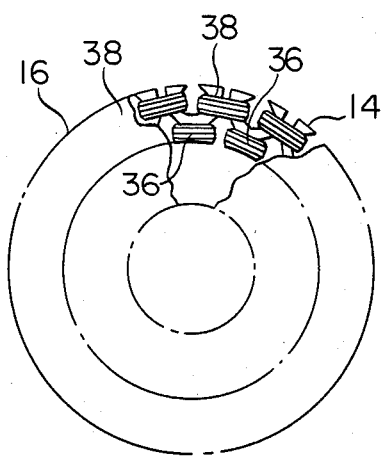
FIG. 2 is a partial plan view showing a stator core and windings thereof of the d.c. motor as illustrated in FIG. 1.
Figure 3:
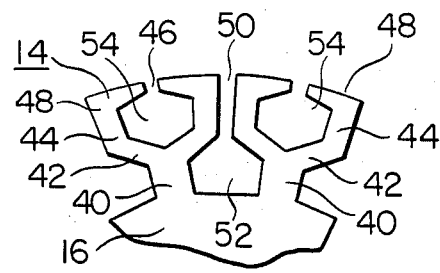
FIG. 3 is a partial enlarged plan view showing a stator core of the d.c. motor as illustrated in FIG. 1.

The stator core 16 in this invention has a plan view as show in FIGS. 2 and 3. Namely, the pole pieces 14 of the stator core 16 camprise a first portion 40 which extends from the hub portion of the stator core 16 in a radially outer direction, two second portions 42 which extend from the outer end of the first portion 40 in opposite circumferential directions from each other, and third portions 44 which extend from each peripheral end of each of the second portions in an outer radial direction. It is desirable provide fourth portions 48 which extend in a peripheral direction approaching each other, and form the gap 46 between the points thereof in order to achieve the necessary starting torque when running. The gap 50 is formed between the third portions 44 in the pole pieces 14. The slots which are formed by these pole pieces 14 comprise a slot 52 for receiving the first phase coils 36 in the inner radial direction, and a slot 54 for receiving the second phase coils 38 in the outer radial direction. While the first phase coils 36 are wound around the first portion 40 of the pole piece 14, the second phase coils 38 are wound over two third portions 44 contiguous to each other through the gap 50.

As the pole pieces 14 are configured as explained above in this invention, there is no gap at the first portion 40 which is wound by the first phase coils 36 and the gap 50 between the third portion 44 and the second phase coils 38 is extremely small. So this invention can provide a large space which can be utilized as a slot because there is no unnecessary space in comparison with the prior art that uses linearly extended pole pieces. Therefore, the winding of the coils becomes easier to perform. Also since unnecessary space can't be made within the coils, a reduction in coils measurement, that is, coils strand in length results, and motor performance is increased as the direct current resistance is lower. Further, this invention can provide a brushless d.c. motor which has a smaller coil end in height and in which the measurement of the total size of the motor in the shaft direction can be reduced by winding the coils in-line since the size of the slots is greater and the winding work easier.

In the embodiment as described and illustrated above, the stator winding 18 is made up of coils having two phases which comprise first phase coils 36 and second phase coils 38, but this invention may also be applied to a brushless d.c. motor having more than two phase coils.

What is claimed is:

1. A brushless d.c. motor having a stator and a rotor;

said stator comprising a stator core with a plurality of magnetic pole pieces disposed circumferencially and separated by slots, stator windings wound around said magnetic pole pieces, a pattern conductor for frequency generation mounted on said stator core, and a drive circuit connectable to a power source for controlling an exciting current to said stator windings in response to a speed control signal from said pattern conductor; and said rotor comprising a yoke rotatably mounted on said stator, a plurality of permanent magnets mounted on said yoke and having magnetic pole faces in opposition to magnetic pole faces of said magnetic pole pieces of said stator core, and a permanent magnet for frequency generation mounted on said yoke and in opposition to said pattern conductor;

the arrangement being such that said magnetic pieces each have a first portion extending in a radially outward direction, second portions extending from a radially outer end of said first portion in opposite circumferential directions to separate from each other, and third portions extending from tips of said second portions in radially outward direction; and that said stator windings comprise first windings wound on said first portion and serially connected to each other for each of said magnetic poles, and second windings wound on one of said third portions of said magnetic pole and the adjacent third portion of the contiguous magnetic pole and serially connected to each other, and the phase of said first windings is shifted relative to said second windings.

2. A brushless d.c. motor as claimed in claim 1, wherein each of said pole pieces comprises two fourth portions extending from tips of said third portions in circumferentially opposite directions toward each other.

* * * * *